N. O. HENAULT.
MILLINER'S SHEARS.
APPLICATION FILED AUG. 18, 1921.
1,432,246.
Patented Oct. 17, 1922.
2 SHEETS—SHEET 1.
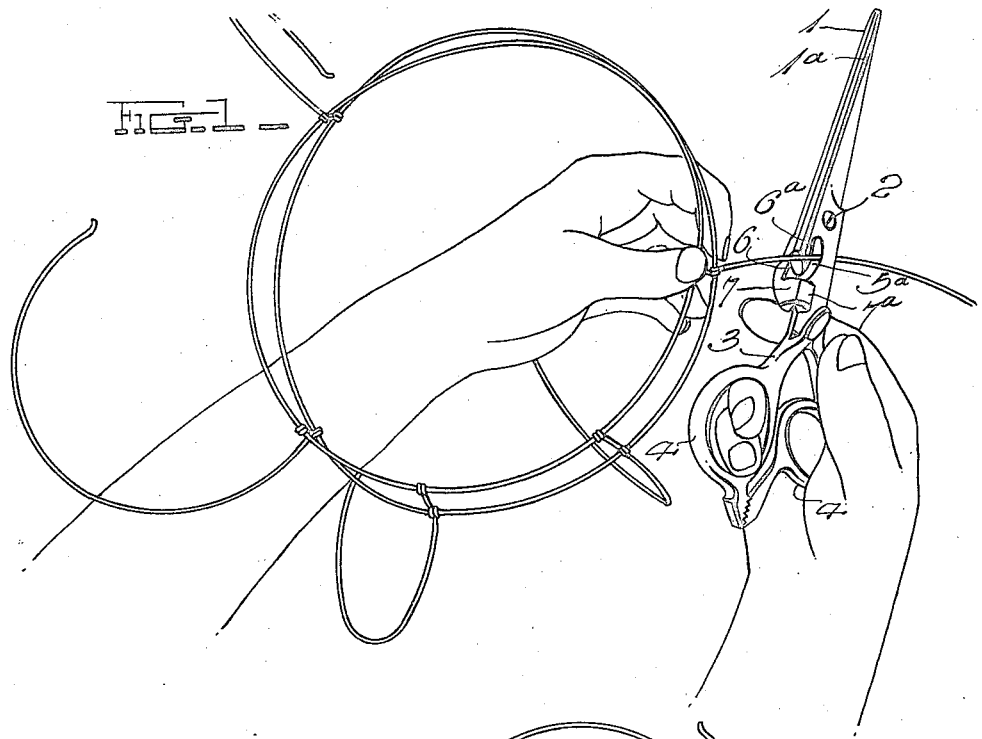
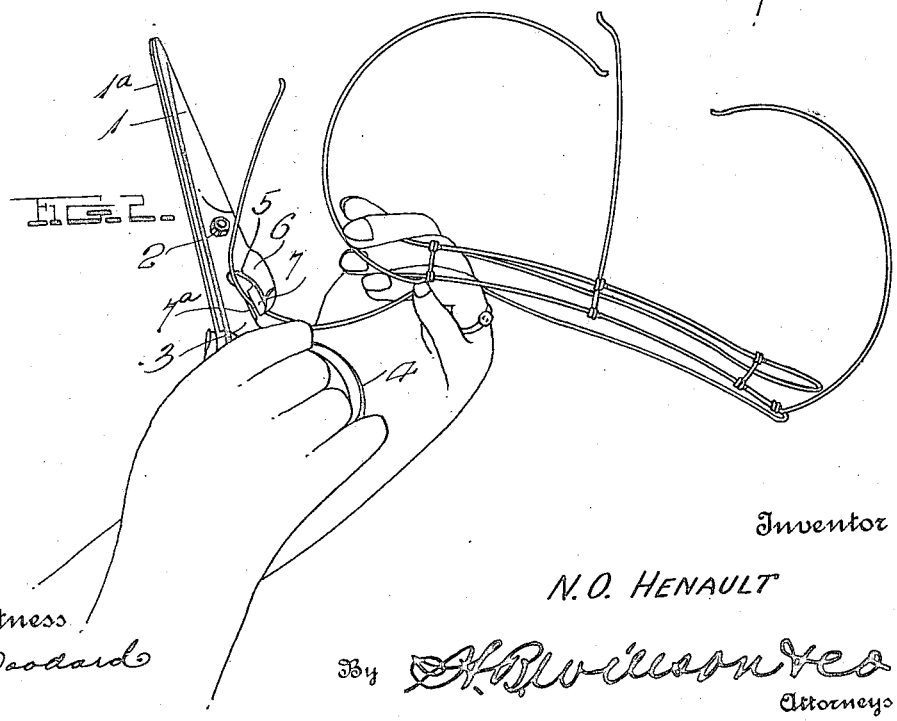
Witness
H. Woodard
Inventor
N. O. HENAULT
By H. B. Wilson
Attorneys

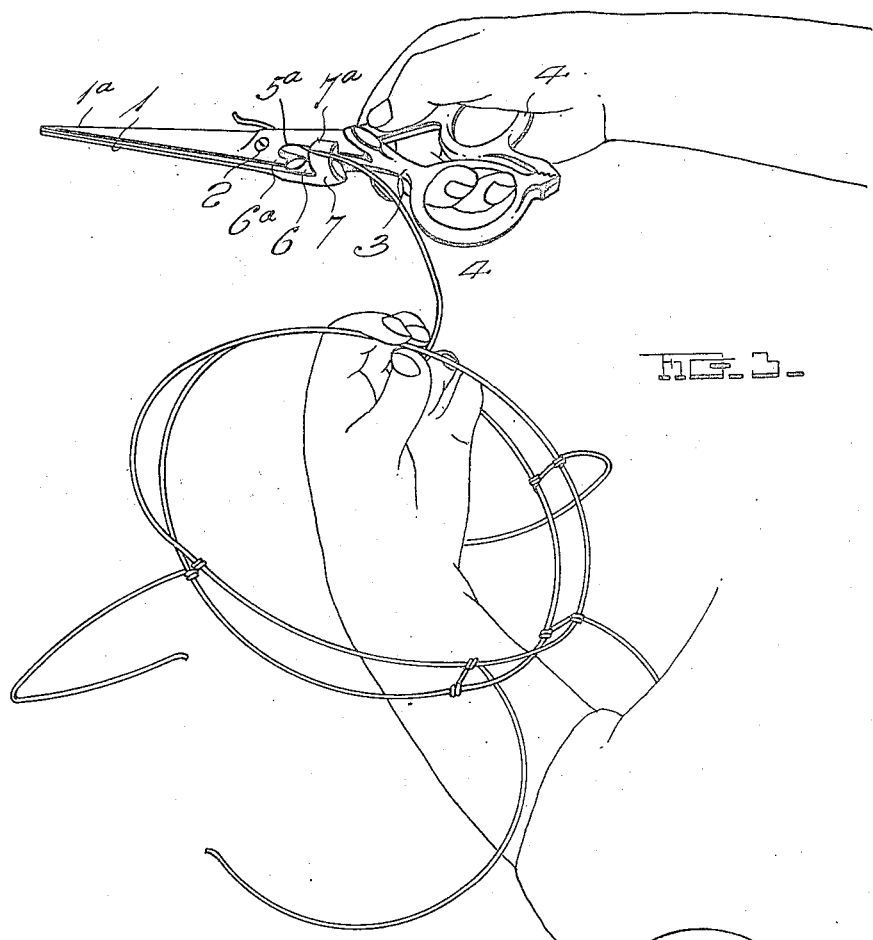
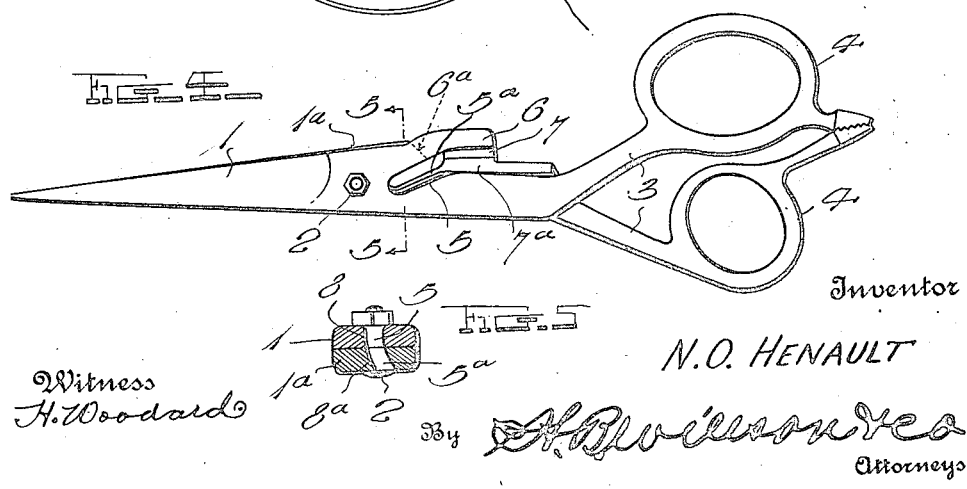
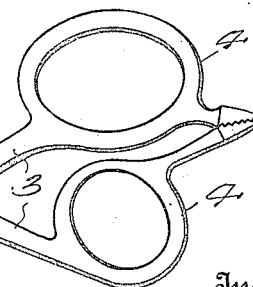

Patented Oct. 17, 1922.

1,432,246

UNITED STATES PATENT OFFICE.

NELLIE O. HENAULT, OF BUTTE, MONTANA.

MILLINER'S SHEARS.

Application filed August 18, 1921. Serial No. 493,240.

*To all whom it may concern:*

Be it known that I, NELLIE O. HENAULT, a citizen of the United States, residing at Butte, in the county of Silver Bow and State of Montana, have invented certain new and useful Improvements in Milliners' Shears; and I do declare the following to be a full, clear, and exact description of the invention, such as will enable others skilled in the art to which it appertains to make and use the same.

My invention relates to improvements in milliners' shears, and has for its principal object to improve upon the construction shown by my U. S. Patent No. 617,018 of January 3, 1899.

One of the improvements consists in providing the inner edge portions of the blades with registering slots behind the pivot of said blades, said slots being co-operable with each other in forming effective means for curving and abruptly bending the wire when making hat frames.

Another improvement consists in so relating the above-mentioned slots with the wire cutters, as to permit the latter to be used while the wire is still in the slots, after a curving or bending operation has been completed.

With the foregoing in view, the invention resides in the novel subject-matter herein described and claimed, the descriptive matter being supplemented by the accompanying drawings.

Figure 1 is a perspective view, showing the use of my invention in curving a wire forming part of a hat frame;

Figs. 2 and 3 are perspective views showing the manner in which the shears are used for cutting the wire without removing the latter from the curving slots;

Fig. 4 is a side elevation of the shears in closed position; and

Fig. 5 is a detail transverse sectional view as indicated by line 5—5 of Fig. 4.

In the drawings above briefly described, the numerals 1 and 1$^a$ designate two blades pivoted together in the usual manner as indicated at 2, the rear extremities of said blades being provided with the usual shanks 3 having handles 4. The inner edge portions of the blades 1 and 1$^a$, that is, the portions of said blades which are disposed innermost when the shears are open, are provided with registering longitudinal slots 5 and 5$^a$ respectively which preferably extend obliquely to some extent as shown most clearly in Fig. 4. The slots 5 and 5$^a$ leave fingers 6 and 6$^a$ between themselves and the edges of the blades, which fingers facilitate engagement of the wire with the slots.

At the rear ends of the slots 5 and 5$^a$, the blades 1 and 1$^a$ are provided with wire cutting lugs 7 and 7$^a$ respectively, the cutting edges of said lugs being offset laterally from the blades as shown. The lug 7 is positioned at the outer edge of the slot 5 and is carried by the finger 6, while the lug 7$^a$ is disposed at the inner edge of the slot 5$^a$, and by reference to Figs. 1, 3 and 4, it will be seen that the short finger 6$^a$ terminates at such a point as to clear the lug 7.

By opening the shears to such an extent as to allow a piece of wire to pass between the cutting lugs 7 and 7$^a$, this wire may be moved easily into the slots 5 and 5$^a$. Then, by turning the shears on an axis traversing the wire and drawing said shears along the wire, the latter may be curved to any required extent, according to the design of the hat frame which is being made. To facilitate this operation, the edge walls of the slots preferably curve transversely and also slant as depicted in Fig. 5. The slant is also advantageous since it provides two acute angles 8 and 8$^a$ (Fig. 5) around which the wire may be bent when an abrupt bend is necessary.

When the bending or curving operation is completed, the shears are opened sufficiently to permit the wire to be interposed between the cutting lugs 7 and 7$^a$ and these lugs are then used to sever the wire, permitting this to be quickly and easily done without the necessity of removing the wire from the curving slots and using a separate instrument for cutting.

The device shown by my own Patent No. 617,018, has for years been an extremely successful article of manufacture, but the present invention is even more efficient and desirable. Since excellent results may be obtained from the exact details disclosed, they may well be followed. It is to be understood, however, that within the scope of the invention as claimed, numerous minor changes may be made.

I claim:

1. Milliners' shears comprising pivotally connected blades and handle-carrying shanks extending rearwardly therefrom, the inner edge portions of said blades having registering longitudinal wire-curving slots in rear of the pivot, the rear ends of said slots being open, leaving rearwardly extending fingers between them and the outer edges of the blades.

2. Milliners' shears comprising pivotally connected blades and handle-carrying shanks extending rearwardly therefrom, the inner edge portions of said blades having registering longitudinal wire-curving slots in rear of the pivot, the rear ends of said slots being open, leaving rearwardly extending fingers between them and the outer edges of the blades, and co-acting wire cutting lugs on the two blades at the rear ends of said slots, one lug being disposed at the inner edge of one slot and the other lug being at the outer edge of the other slot, one of said fingers being of less length than the other to clear said other lug.

3. A structure as specified in claim 1, the edge walls of said slots slanting transversely and being transversely curved.

In testimony whereof I have hereunto set my hand.

NELLIE O. HENAULT.